J. B. STEWART & J. D. WINFREY.
SPRING WHEEL.
APPLICATION FILED JULY 18, 1917.
1,284,809.
Patented Nov. 12, 1918.
2 SHEETS—SHEET 1.
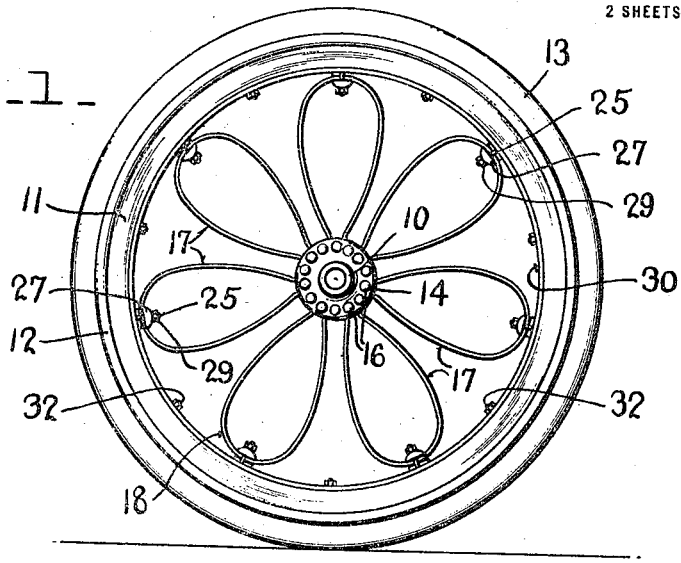
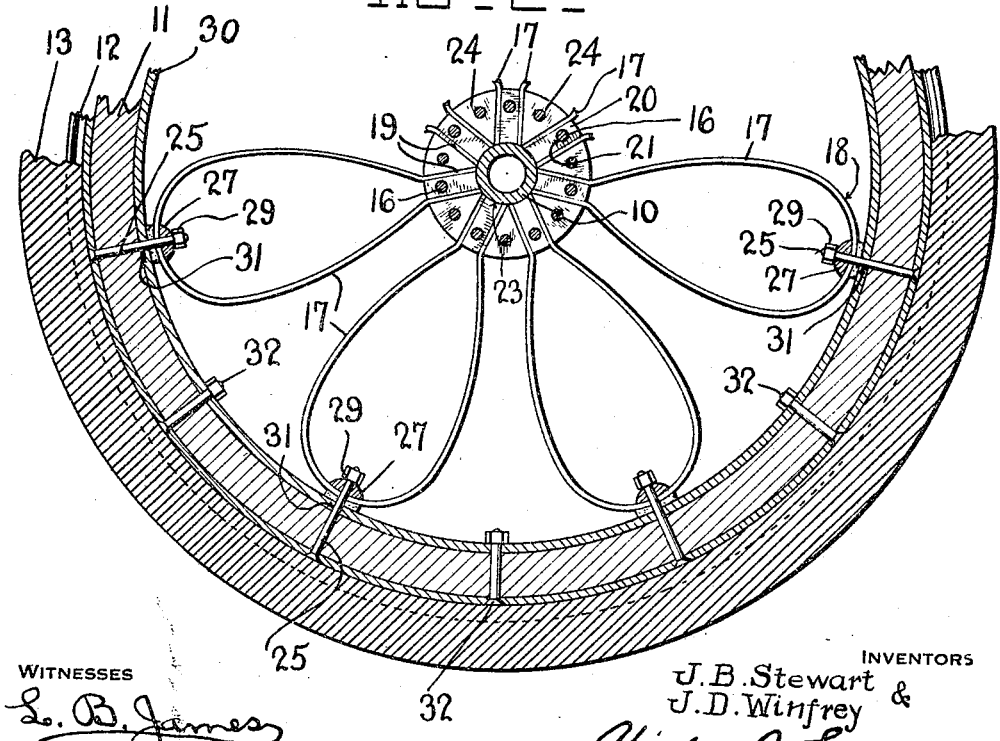
WITNESSES
L. B. James
T. L. Mockabee
INVENTORS
J. B. Stewart &
J. D. Winfrey
BY Victor J. Evans
ATTORNEY

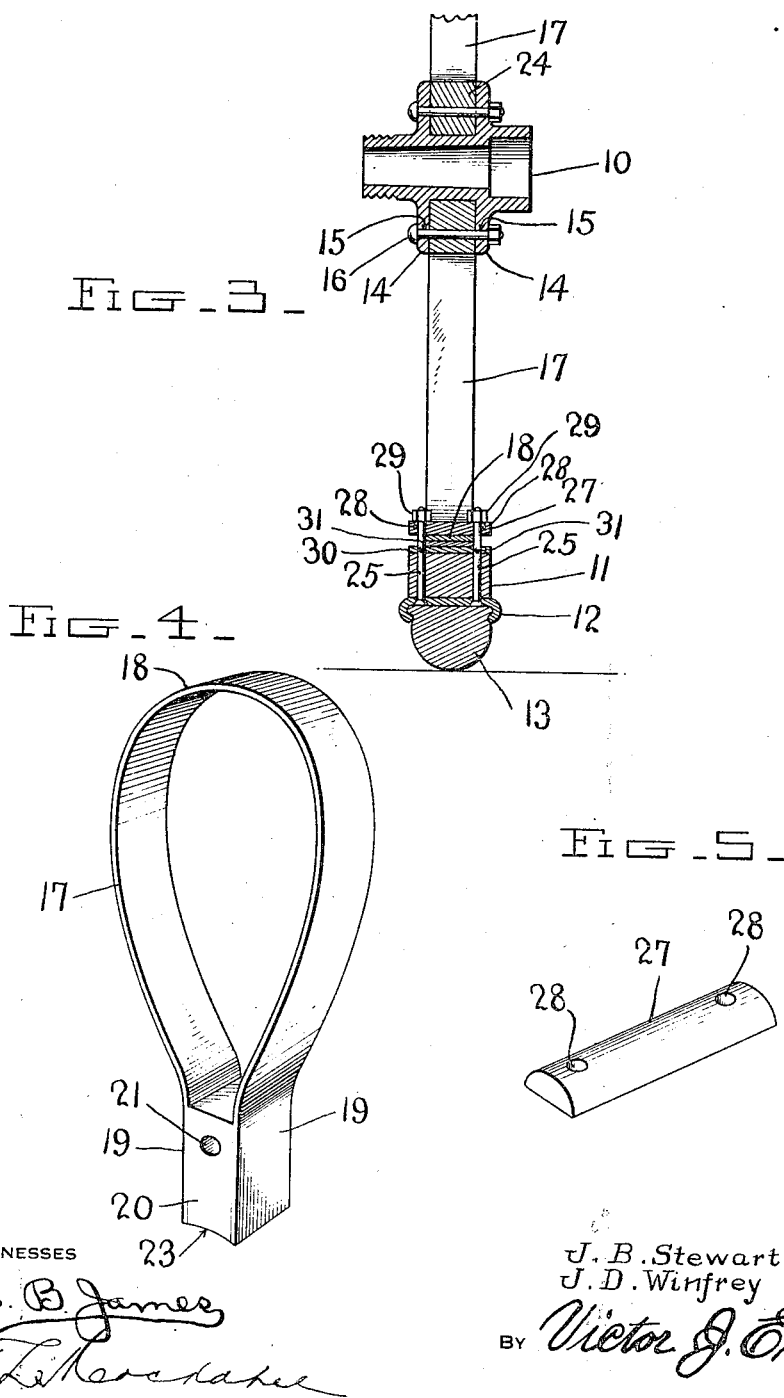

UNITED STATES PATENT OFFICE.

JOSEPH B. STEWART AND JOHN D. WINFREY, OF TROY, TEXAS.

SPRING-WHEEL.

1,284,809.

Specification of Letters Patent. Patented Nov. 12, 1918.

Application filed July 18, 1917. Serial No. 181,365.

*To all whom it may concern:*

Be it known that we, JOSEPH B. STEWART and JOHN D. WINFREY, citizens of the United States, residing at Troy, in the county of Bell and State of Texas, have invented new and useful Improvements in Spring-Wheels, of which the following is a specification.

This invention relates to spring wheels for use upon vehicles of all descriptions.

An object of the invention is to provide a form of resilient spoke which may be substituted for the wooden spokes of the wheels now commonly used upon vehicles, the resilient spokes being so constructed as to permit of their being secured between the hub plates by means of the bolts now employed for holding the inner end of the wooden spokes in position.

Another object is to provide a novel form of resilient spoke which may be easily and quickly substituted for the wooden spoke, the said spokes being separately formed so that one or more may be removed without destroying any of the remaining ones if for any reason this is desired.

The invention further contemplates the provision of novel means for securing the spokes to the felly and the insertion of a wear or reinforcing band between said felly and spokes, so that should the said felly be of different construction, there would be no tendency to wear out at the point of contact with the spoke.

With the above and other objects in view, the invention consists of the following novel combination and arrangement of parts, hereinafter more fully described and illustrated in the accompanying drawings, in which—

Figure 1 is an elevation of a wheel of ordinary construction having the improved spokes applied thereto;

Fig. 2 is an enlarged sectional view through one-half of the wheel;

Fig. 3 is a transverse sectional view of the same;

Fig. 4 is an enlarged perspective view of one of the spokes; and

Fig. 5 is a similar view of the bar used for connecting the spoke with the felly of the wheel.

Referring in detail to the drawings, like characters of reference denote corresponding parts throughout the several views.

In the drawings, there is illustrated an automobile wheel of ordinary construction, which includes a hub 10, a wooden felly 11 and a rim 12, the latter being of the usual clencher type commonly employed for securing a pneumatic tire to the rim. It is the aim of the present invention to provide a wheel in the use of which a pneumatic tire may be dispensed with, the spokes providing the necessary cushioning effect, although the wheel is equally adapted for use in connection with pneumatic tires if desired, the use of the wheel with pneumatic tires adding greatly to ease of travel of the vehicle. The wheel is illustrated, however, in connection with a solid tire, which is shown secured to the rim 12, the tire being designated at 13.

The hub 10 which is of the ordinary construction includes spaced parallel plates 14, provided with the usual registering bolt openings 15 for the passage of bolts 16, by means of which the ordinary wooden spokes are secured to the hub.

The spokes 17 which form the subject matter of the present invention, are each formed of a flat strip of spring metal, which is bent upon itself to provide an outer curved end 18 and inner alined ends 19, the latter being spaced apart and secured to a block 20, which is interposed between these ends. This block is secured to the ends 19, by brazing or any suitable manner and together with the spoke 17 is of sufficient width to fit snugly between the plates 14, the height of the block 20 being co-extensive with the depth of the flanges formed by these plates. Formed in the block 20 is an opening 21, which, when the block is positioned between the plates 14 is adapted to register with the openings 15 formed in these plates. The bolt 16 is then passed through these registering openings and the block secured therein, the said spokes being sprung inward to permit of the insertion of these blocks. The blocks 24 are held in position between the spokes and plates 14 by the use of bolts, which pass through the hub and securely hold them in position, the outward curvature of the spokes at the point 23 also acting to retain the block properly within the housing plates.

Extending through the felly 11 of the wheel are transversely alined bolts 25, the heads of which are preferably within the rim 12, the space between these bolts being just sufficient to receive therebetween the curved portion 18 of the spoke 17. When the invention is used in connection with detachable rims, the bolts 25 pass through the felly only, being provided with counter-sunk heads. Extending transversely through the loop 18 of the spoke is a bar 27, which is provided with openings 28, which are adapted to receive the ends of the bolts 25, so that the spoke may be clamped to the felly through the medium of this bar and the nuts 29.

Interposed between the curved portions 18 of the spokes and the felly 11 is a reinforcing band 30, which is provided with spaced openings 31, through which the bolts 25 are also adapted to pass, this band serving to prevent wear upon the felly 11 at the point of contact with said spokes. If desired, additional fastening devices in the form of bolts 32 may be used for securing the wear band to the felly, one of these bolts being positioned between each pair of the spokes 17 as shown in the drawings.

It is believed that from the foregoing description, when taken in connection with the accompanying drawings, the construction and advantages of the invention will be apparent. The right is reserved to make such changes in the form and proportion thereof as will fall within the scope of the claim hereto appended.

In addition to the many advantages of the invention, it may be used in connection with either solid or pneumatic tires, and when used with the former, the same cushioning or spring effect will be obtained as with the ordinary wheel when used in connection with the pneumatic tire. When the wheel is used with the pneumatic tire, it will increase the comfort of riding by eliminating vibrations in the vehicle, and it will also eliminate rattling. It will increase the life of the vehicle and tire mileage, on account of its smooth riding qualities.

Having described the invention, what is claimed is:

The combination with a hub provided with spaced parallel plates, said plates being provided with spaced circumferentially disposed alined openings therethrough, and a felly, of removable spokes each formed from a flat strip of spring metal bent upon itself to form a loop, spaced parallel extremities provided at the open end of said loop forming shoulders at their juncture with the bowed portions of the loop, a spacing block permanently secured between the parallel ends of the loop and having an opening therethrough adapted to register with alined openings in the hub plates when the block is positioned between said plates, a fastening device engageable in the opening in the plate and spacing block, and removable filler blocks having openings therein also adapted to register with the openings in the hub plates and snugly fitting within the hub, fastening devices engageable in these last mentioned openings, said filler block being engageable with said shoulders and means for removably securing the spokes to the felly.

In testimony whereof we affix our signatures.

JOSEPH B. STEWART.
JOHN D. WINFREY.

Copies of this patent may be obtained for five cents each, by addressing the "Commissioner of Patents, Washington, D. C."